Aug. 21, 1962  W. J. HANSON  3,049,845
DOCUMENT HANDLING APPARATUS
Filed Oct. 5, 1960  5 Sheets-Sheet 1

INVENTOR
WALTER J. HANSON
BY
ATTORNEY

Aug. 21, 1962    W. J. HANSON    3,049,845
DOCUMENT HANDLING APPARATUS
Filed Oct. 5, 1960    5 Sheets-Sheet 4

INVENTOR.
WALTER J. HANSON
BY
William W. Holloway Jr.
ATTORNEY

INVENTOR.
WALTER J. HANSON
BY
William W. Holton Jr.
ATTORNEY

United States Patent Office
3,049,845
Patented Aug. 21, 1962

3,049,845
DOCUMENT HANDLING APPARATUS
Walter J. Hanson, Old Greenwich, Conn., assignor to Pitney-Bowes, Inc., Stamford, Conn., a corporation of Delaware
Filed Oct. 5, 1960, Ser. No. 60,710
15 Claims. (Cl. 53—62)

This invention relates to an apparatus for handling documents and more particularly, to such an apparatus which is effective to separate a stack of intermixed distinctive and non-distinctive documents into groups whereby each of the groups comprises a respective distinctive document (such as a statement of account) and any non-distinctive documents (such as charge slips) between one side of the respective distinctive document and the next distinctive document of the stack.

Many charge account facilities, in processing their accounts, periodically total all charged items in each account and send each client or customer a statement of the total charge along with a copy of the charge slip for each individual item. Oftentimes at least, each statement is prepared from the associated charge slips and is placed with these respective charge slips in a stack. Subsequently, each statement and the charge slips associated therewith are separated from the stack and inserted into an envelope for mailing to the respective client or customer. Frequently, one or more advertisements, notices, etc. are also inserted into each of the envelopes before mailing. The apparatus particularly disclosed herein is effective to provide the operations of separating into a group and from a stack, the statement of each account and the charge slips associated therewith; collating an advertisement, notice, etc. with each of these groups; and inserting the collation into an envelope. In this regard, the apparatus as disclosed herein includes a first hopper which, during each operating cycle, is effective to feed from a stack to a first delivery position one distinctive document (such as a monthly charge account statement) and any non-distinctive documents (the charge slips associated with the respective statement) between one side of the respective distinctive document and the next succeeding distinctive document of the stack. At substantially the same time, a single document (such as an advertisement, notice, etc.) is fed from a second hopper to a second delivery position spaced forwardly of the first delivery position. Also, and again at substantially the same time, an envelope is fed from a third hopper to a third delivery position spaced forwardly of the second delivery position. A conveyor then forwardly advances the documents from the first delivery position to a first location between the first and second delivery positions, and assembles any documents that were previously advanced to said first location (during the immediately preceding cycle) with the document at said second delivery position and forwardly advances this assembly to a location between the second and third delivery positions. A ram forwardly advances this assembly and inserts it into the envelope at the third delivery position and forwardly advances the filled envelope to a location beyond the third delivery position. It will be apparent, then, that during each operating cycle, one or more documents will be fed from the first hopper to a first delivery position; a single document and a single envelope will be fed from the second and third hoppers, respectively, to a respective delivery position; the document or documents at each delivery position will be forwardly advanced beyond that respective delivery position; and one set of documents from the first and second hoppers will be collated and inserted into an envelope.

An object of this invention is to provide a novel apparatus for separating a stack of intermixed distinctive and non-distinctive documents into groups whereby each of the groups comprises a respective distinctive document and any non-distinctive documents between one sides of the respective distinctive document and the next distinctive document of the stack.

A further object of this invention is to provide such an apparatus which is also effective to collate an additional document with each of said groups and/or to insert each of said groups, with or without one of said additional documents, into an envelope.

Another object of the invention is the provision of such an apparatus which is automatically operable to feed documents in one-by-one succession from a stack of intermixed distinctive and non-distinctive documents such that this feed of documents automatically stops each time one of said groups is fed and then re-starts after a lapse of time.

Still another object of the invention is the provision of such an apparatus which is automatically operable cyclically to feed the documents of one of said groups in one-by-one succession from a stack during one portion of each cycle, to forwardly advance the fed documents during a succeeding portion of each cycle, and to delay the start of said succeeding portion of each cycle until said feed of documents stops at such times as more than a predetermined number of documents are fed during said one portion of a cyclic. A further object is the provision of such an apparatus which is automatically operable to feed a document from a second stack and to feed an envelope from a third stack during said one portion of each cycle, and to collate the documents of one of said groups with a document from said second stack and insert the collation into an envelope from said third stack during said succeeding portion of each cycle.

Another object of the invention is to provide such an apparatus which is economical and which is reliable and efficient in operation.

Further objects and advantages will become apparent as the description proceeds.

Several embodiments of the invention are shown in the accompanying drawings wherein.

Figures 1, 2, 3:
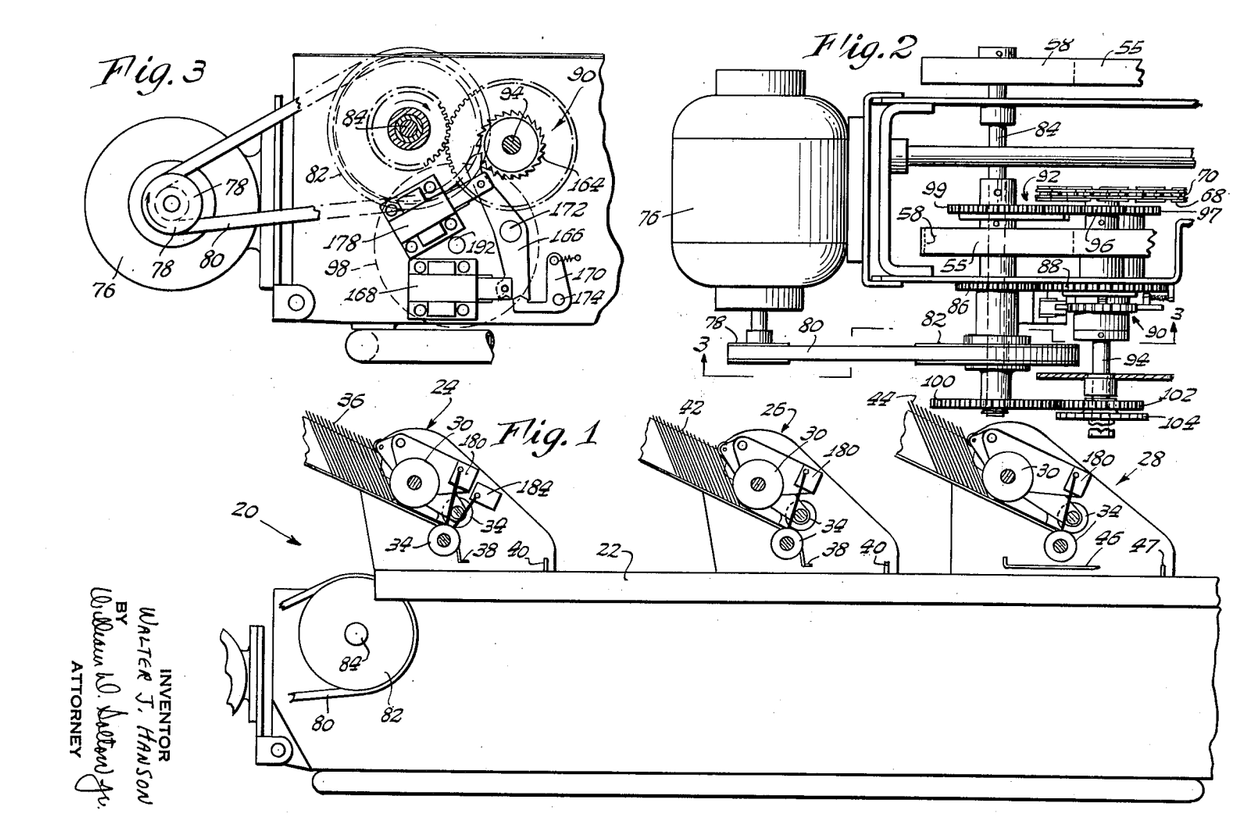
FIG. 1 is a fragmentary side elevational view partly in section of an apparatus including two document feed hoppers and an envelope feed hopper according to a first embodiment of the invention.
FIG. 2 is a top plan view, on an enlarged scale, showing a portion of the drive means for this apparatus.
FIG. 3 is a side elevational view taken in section along line 3—3 in FIG. 2.
Figures 6, 7, 8, 8A, 9:
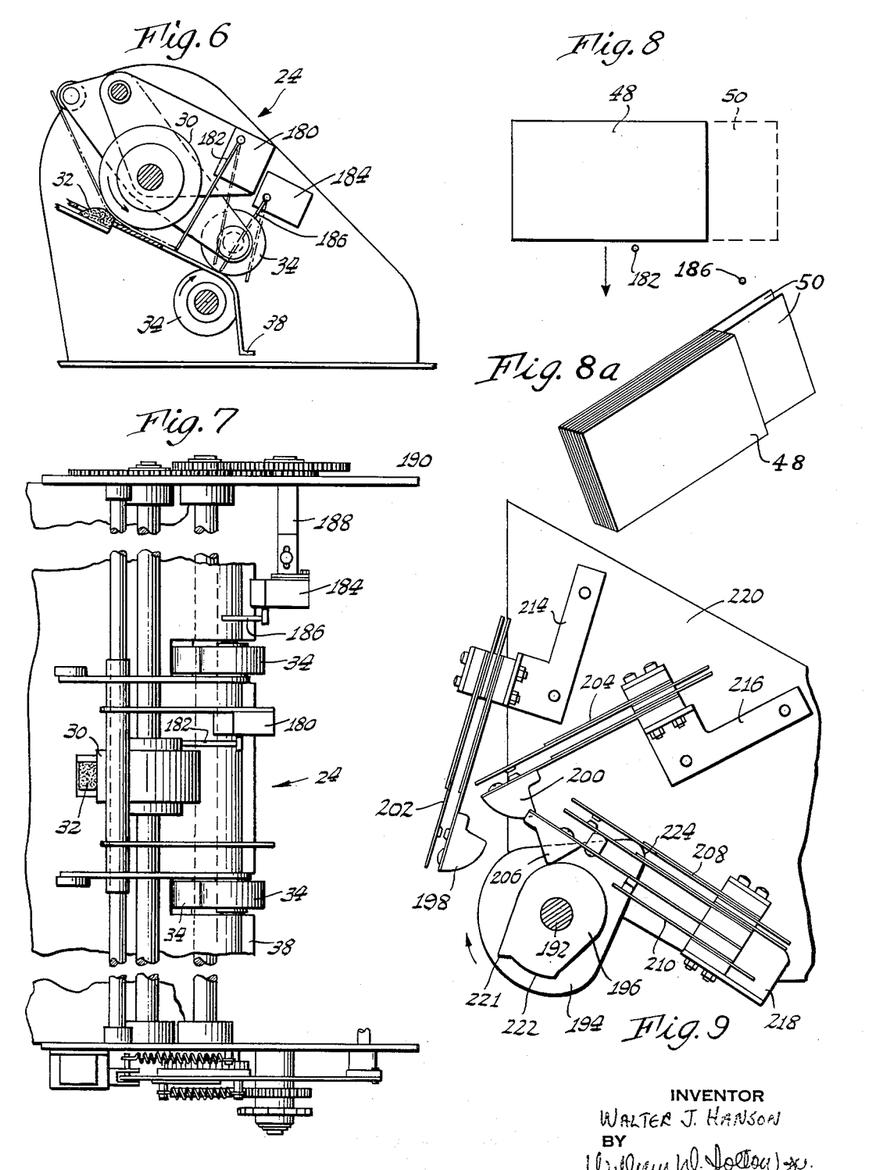
FIG. 6 is a side elevational view, partly in section and on an enlarged scale, of one of the document feed hoppers according to said first embodiment as adapted for the feeding of a variable number of documents during each operating cycle of the apparatus.
FIG. 7 is a fragmentary top plan view of the structure shown in FIG. 6.
FIG. 8 is a more or less schematic view taken in plan and depicting the relation among a distinctive document shown in broken lines superimposed upon a non-distinctive document shown in full lines, and the actuating arms of two electrical switches of the document feed hopper as shown in FIGS. 6 and 7.
FIG. 8a is a perspective view showing a portion of a stack of distinctive and non-distinctive documents as it is disposed in the hopper shown in FIG. 6 prior to the one-by-one feeding of documents therefrom.
FIG. 9 is a fragmentary elevational view taken from the side opposite that of FIG. 3 and including three cam-operated electrical switches and the cams for operating the same according to said first embodiment.

Referring to the drawing and particularly to FIG. 1 thereof, a document handling machine according to a first embodiment of the invention is generally designated at 20. Machine 20 includes a frame 22 supporting three hoppers generally designated by the reference numerals 24, 26 and 28, respectively. With reference to FIG. 6, hopper 24, as with hoppers 26 and 28, includes a stripper roller 30 cooperable with an abrasive separator element 32 to separate documents from a stack and forwardly feed these documents in one-by-one succession with a small space therebetween to the bite of a pair of feed rollers 34. Referring back to FIG. 1, the stripper roller 30 and feed rollers 34 of hopper 24 are effective to feed documents in one-by-one succession from a stack 36 to a first delivery position defined by a ledge 38 and a retractible stop 40. In similar manner, hopper 26 is effective to feed documents in one-by-one succession from a stack 42 to a second delivery position defined by the ledge 38 and stop 40 of this hopper, and hopper 28 is effective to feed documents in one-by-one succession from a stack 44 to a third delivery position defined by a plate 46 and a retractible stop 47. The stack 36 in hopper 24 is comprised of a plurality of intermixed distinctive and non-distinctive documents. Referring to schematic FIG. 8, a non-distinctive document 48 is shown in full lines superimposed on a distinctive document 50 in broken lines just as they are arranged in the stack 36. According to this first embodiment, the non-distinctive documents 48 may be charge slips shorter in length, as indicated in FIG. 8, than the distinctive documents 50 which may be statements of account. The stack 42 in hopper 26 is comprised of mutually identical documents such as advertising sheets or folders, and the stack 44 in hopper 28 is comprised of mutually identical envelopes.

Figure 5:
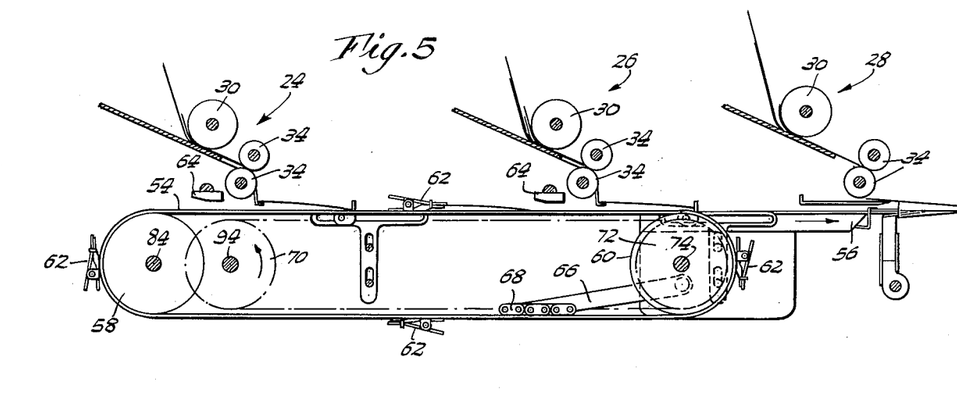
FIG. 5 is a side elevational view of this apparatus showing parts of the respective hoppers in relation to means for forwardly advancing pieces fed by these hoppers.

In a manner that will become apparent as the description proceeds, hopper 24 feeds one or more documents from stack 36 to the first delievery position, hopper 26 feeds a single document from stack 42 to the second delivery position, and hopper 44 feeds a single document in the form of an envelope to the third delivery position; all during each cycle of operation of the machine 20. Referring to FIG. 5, a cyclically operable conveyor 54 and ram 56 operate to forwardly advance the respective document or documents at each of the three delivery positions and to insert a collation of previously fed documents into an envelope. In this regard, the conveyor 54 as shown in FIG. 5 is trained about pulley wheels 58 and 60. The conveyor 54 includes a pair of laterally spaced endless belts 55, 55 as indicated in FIG. 2. A plurality of side-by-side pairs of gripper members 62 are spaced about the conveyor 54 and each gripper member is normally resiliently biased to closed gripping condition. Conveyor 54 is intermittently operable, after each feeding cycle of the hoppers 24, 26 and 28, to move one of the pairs of gripper members 62 past a cam 64 adjacent each of the hoppers 24 and 26 to open the respective pair of gripper members, and past the respective delivery position of these two hoppers. As the respective pair of gripper members 62 reaches and then moves past the delivery position of hopper 24, the respective cam 64 releases that pair of gripper members to grip the document or documents at this delivery position, and that pair of gripper members advances with the gripped document or documents to a location between the delivery positions of hoppers 24 and 26. This pair of gripper members 62, during the next operating cycle of the machine, is moved by the conveyor 54 past the cam 64 and the delivery position of hopper 26 whereby this pair of gripper members picks up the document previously fed by hopper 26 to its delivery position thereby collating the latter document with the one or more documents previously picked up by that pair of gripper members, and forwardly advances this collation to a location between the respective delivery positions of hoppers 26 and 28. The ram 56 overtakes the pair of gripper members 62 at this location, forwardly advances the collation of documents from these gripper members into an envelope at the delivery position of hopper 28, and forwardly advances the filled envelope to a location at which the successively filled envelopes are, for example, stacked or fed in one-by-one succession through a postage meter. The ram 56 reciprocates in timed relation with the conveyor 54. In this regard, the ram 56 is pivotally connected to one end of a sprocket chain 68. Sprocket chain 68 is trained about sprocket wheels 70 and 72. It will be seen that by virtue of this arrangement, ram 56 is reciprocated forwardly and rearwardly, and this in timed relation with conveyor 54.

It is to be noted that, except as particularly pointed out herein, the document handling machine 20 is identical to that disclosed in U.S. Patent No. 2,736,999 granted on March 6, 1956 to F. J. Rouan et al. For details of structure and operation of the machine 20 not particularly set forth in this description, reference may be had to this U.S. Patent.

Figure 4:
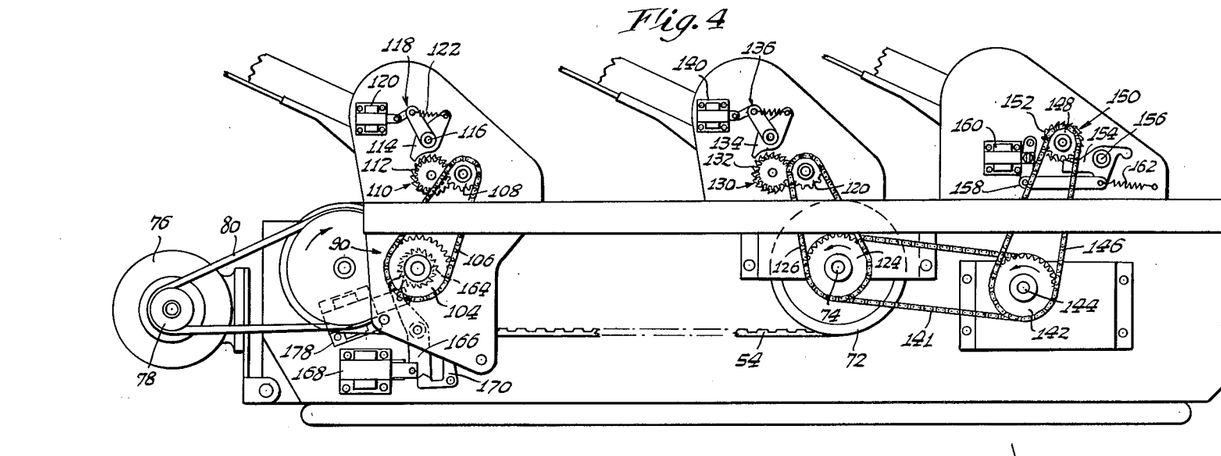
FIG. 4 is a view similar to FIG. 1 but showing details of the drive means for the apparatus.

The drive for the document handling machine 20 will now be described. Referring to FIGS. 2–4, this drive originates with an electric motor 76 which, when energized, continuously drives a pulley wheel 78. A belt 80 is driven by pulley wheel 78 and drives a pulley wheel 82 rotatable about a shaft 84. Pulley wheel 82 is fixed to and drives a gear 86 also rotatable about the shaft 84. Gear 86 meshes with and drives an input gear 88 of a main clutch generally designated at 90. Main clutch 90, when engaged, drives the output sprocket wheel 70 of the clutch, this sprocket wheel being pinned to the output shaft 94 of the clutch 90. Also pinned to output shaft 94 is an output gear 96 of the main clutch 90. Output gear 96 drives a gear train including gear 97, gear 98 (shown in broken lines in FIG. 3), and gear 99. Gear 98 rotates one revolution during each operating cycle of the document handling machine 20, and gears 98 and 99 form part of an intermittent (Geneva type) gear transmission generally designated at 92. Pulley wheels 58, 58 are also pinned to the shaft 84. As can best be seen in FIG. 5, pulley wheels 58, 58 drive conveyor belts 54, 54, and sprocket wheel 70 drives the sprocket chain 68 linked to the ram 56.

The drive for the document handling machine 20 as thus far described is identical to that disclosed in the above-named U.S. patent to F. J. Rouan et al. with the exceptions that gear 86 is preferably somewhat smaller in diameter and has less teeth than does its counterpart in this patent and gear 88 is preferably somewhat larger in diameter and has more teeth than does its counterpart in this patent whereby the feeding rate of hopper 24 is increased, as will become apparent as this description proceeds. The drive for the document handling machine 20 further differs over that disclosed in said patent as will now be described. A gear 100 is fixed to and rotates about shaft 84 with the pulley wheel 82. Gear 100 meshes with and drives a gear 102, the latter being freely rotatable about the shaft 94. Gear 102 is fixed to and drives a sprocket wheel 104 about shaft 94. It will be clear from the above that the drive from motor 76 to sprocket wheel 104 by-passes the main clutch 90 whereby the sprocket wheel 104 is continuously driven so long as the motor is energized whereas pulley wheels 58, 58 and sprocket wheel 70 are driven only so long as the main clutch 90 is engaged.

Sprocket wheel 104, as can be seen in FIG. 4, drives a sprocket chain 106 which, in turn, drives a sprocket wheel 108. Sprocket wheel 108 is operatively connected to drive the stripper roller 30 and feed rollers 34, 34 of hopper 24 through a hopper clutch generally designated at 110; all in the manner particularly described in the aforementioned patent to F. J. Rouan et al. Hopper clutch 110 includes a ratchet wheel 112 cooperable with a pawl 114. The pawl 114 engages the ratchet wheel 112 to disengage the hopper clutch 110 thereby quickly to stop the drive to the stripper roller 30 and feed rollers 34, 34 of hopper 24 even though sprocket wheel 108 continues to be driven. The pawl 114 is pivoted at 116 and is connected by a linkage 118 to be operated by the plunger of a solenoid 120. When solenoid 120 is energized, hopper clutch 110 is disengaged; and when this solenoid is de-energized, clutch 110 is engaged under the action of a tension spring 122.

Shaft 74 (FIG. 5), being fixed to sprocket wheel 72, is driven by motor 76 through main clutch 90 and sprocket chain 68. Referring to FIG. 4, a sprocket wheel 124 is pinned to shaft 74 and drives a sprocket chain 126 in turn to drive a sprocket wheel 128. Sprocket wheel 128 is operatively connected to drive the stripper roller 30 and feed rollers 34, 34 of the hopper 26 in the same manner as that described above with respect to hopper 24. In this regard, a hopper clutch 130, ratchet wheel 132, pawl 134, a linkage 136 and a solenoid 140 of hopper 26 operate in the same manner as do their counterparts in the hopper 24.

A sprocket wheel identical to but behind the sprocket wheel 124 (as viewed in FIG. 4) drives a sprocket chain 141 which, in turn, drives a sprocket wheel identical to but behind a sprocket wheel 142. The sprocket wheel driven directly by chain 141, as well as the sprocket wheel 142, is fixed on a shaft 144. A sprocket chain 146 is driven by sprocket wheel 144 and drives a sprocket wheel 148. Sprocket wheel 148 is operatively connected to drive the input side of a hopper clutch generally designated at 150. Hopper clutch 150 includes a ratchet wheel 152 cooperable with a pawl 154. Pawl 154 pivots at 156 and is connected through a linkage 158 with the plunger of a solenoid 160. When solenoid 160 is energized, pawl 154 engages the ratchet wheel 152 to disengage the hopper clutch 150. A tension spring 162 is connected to pawl 154 resiliently to bias the latter to disengaged relation with ratchet wheel 152 whereby hopper clutch 150 is engaged so long as solenoid 160 is de-energized. As with hoppers 24 and 26, the stripper roller 30 and feed rollers 34, 34 of hopper 28 are operatively connected to be driven when hopper clutch 150 is engaged and to be quickly stopped when hopper clutch 150 is disengaged.

Referring to FIG. 3, the main clutch 90 includes a ratchet wheel 164 cooperable with a pawl 166, the latter being associated with a solenoid 168 and a detent pawl 170; all as disclosed in the above-noted patent to F. J. Rouan et al. The pawl 166 is pivoted at 172. The detent pawl 170 is pivoted at 174 and is resiliently biased by a spring 176 to retain pawl 166 in the engaged relation with the ratchet wheel 164 as shown in FIG. 3 or in disengaged relation with this ratchet wheel. Unlike the machine disclosed in said patent, movement of the pawl 166 to disengaged relation with ratchet wheel 164 is accomplished by a second solenoid 178 whose plunger is connected to the pawl 166. Accordingly, pawl 166 is moved from disengagement into engagement with ratchet wheel 164 to disengage main clutch 90 upon energization of solenoid 168; pawl 166 is moved from engagement to disengagement with ratchet wheel 164 to engage main clutch 90 upon energization of solenoid 178; and detent pawl 170 retains pawl 166 in the last one of the two positions to which it was moved until moved to the other position upon energization of the respective one of solenoids 168 and 178.

Each one of the hoppers 24, 26 and 28 includes an electrical switch 180 actuated by a switch operating finger 182. Each of switches 180 and switch operating fingers 182 is identical in structure and individual function with its counterpart in the machine disclosed in said patent to F. J. Rouan et al. That is, the operating finger 182 of each of the hoppers 24, 26 and 28 lies in the path of feed of and is tripped by the leading edge of every successive document fed by the respective hopper. The switch 180 is each of the hoppers 24, 26 and 28 is a normally open switch which is closed when its respective operating arm 182 is tripped.

Referring particularly to FIG. 6, the hopper 24 is provided with a second switch 184 having an operating arm 186. Switch 184, as can be seen in FIG. 7, is adjustably supported by a bracket 188 carried by a side plate 190 of the hopper 24. As shown in FIG. 8, the operating arm 186 of switch 184 is disposed laterally of switch operating arm 182 to lie in the feed path of the distinctive documents 50 but not in the feed path of the non-distinctive documents 48. Furthermore, as best shown in FIGS. 6 and 8, the operating arm 186 of switch 184 is disposed forwardly (in the direction of document feed) of the operating arm 182 of switch 180. It follows that switch 180 of hopper 24 is tripped by each document fed, whether distinctive or non-distinctive; only the distinctive documents 50 trip both of switches 180 and 184 when fed; and each distinctive document trips switch 180 before tripping switch 184 and releases switch 180 to untripped condition before releasing switch 184 to untripped condition. Switch 184 is a normally closed switch which is opened when its respective operating arm 186 is tripped. Switch operating arms 182 and 186 are shown in their respective untripped positions in full lines in FIG. 6 and in their respective tripped positions in broken lines in this figure.

The gear 98 (FIG. 3) is fixed to a shaft 192 and, as noted above, this gear (as well as the shaft 192) rotates one revolution during each operating cycle of the document handling apparatus 20. Referring to FIG. 9, the shaft 192 has two cams 194 and 196, respectively, fixed thereon. Cam 194 is aligned and engageable with cam followers 198 and 200 of normally open electrical reed switches 202 and 204, respectively. Cam 196 is aligned and engageable with a cam follower 206 of a normally open electrical reed switch 208 and a normally closed electrical switch 210. Cam followers 198, 200 and 206, as well as a boss 212 between switches 208 and 210, are formed of any of the common electrical insulating materials. Switches 202, 204 and 208 are respectively supported by brackets 214, 216 and 218 carried by a frame member 220 of the machine 20. Switch 202 is a cycle stop switch, switch 204 is a cycle resume switch, and switches 208 and 210 are momentary demand switches. During each full clockwise rotation of the shaft 192 from the position shown in FIG. 9, the following takes place. First, a raised portion 221 of a node 222 of cam 196 deflects cam follower 206 to close switch 208 and open switch 210. Then, raised portion 221 of cam 196 partially releases cam follower 206 to engagement with the remainder of node 222 whereby demand switch 210 recloses while demand switch 208 remains closed. The node 222 of cam 196 then rides off cam follower 206 to effect re-opening of demand switch 208. Subsequently, a node 224 of cam 194 deflects cam followers 198 and 200 in succession first to close and then open switch 202 and then to close and then open switch 204.

Briefly to recapitulate the drive means for the document handling machine 20, the motor 76 drives the respective stripper roller 30 and feed rollers 34, 34 of hoppers 26 and 28 through hopper clutches 130 and 150, respectively. So long as the motor 76 is energized and main clutch 90 is engaged, hopper clutch 130 is engaged to drive the stripper roller 30 and feed rollers 34, 34 of hopper 26 while solenoid 140 is de-energized and hopper clutch 130 is disengaged whereby the stripper roller 30 and feed rollers 34, 34 of hopper 26 are stopped while solenoid 140 is energized. Likewise, and again so long as the motor 76 is energized and main clutch 90 is engaged, hopper clutch 150 is engaged to drive the stripper roller 30 and feed rollers 34, 34 of envelope hopper 28 while solenoid 160 is de-energized and hopper clutch 150 is disengaged whereby the stripper roller 30 and feed rollers 34, 34 of envelope hopper 28 are stopped while solenoid 160 is energized. The motor 76 also drives both the conveyor 54 and the sprocket chain 68 for driving the ram 56 through the main clutch 90. The drive from motor 76 to the hopper clutch 110 of hopper 24 by-passes the main clutch 90, however, so that the drive to the hopper clutch 110 is not stopped by disengagement of the main clutch whereas the drive to hopper clutch 130 of hopper 26, hopper clutch 150 of hopper 28, conveyor 54 and ram 56 is stopped by disengagement of the main clutch. The stripper roller 30 and feed rollers 34, 34 of hopper 24 are stopped only by the energization of solenoid 120 to disengage clutch 110 and/or by de-energizing the motor 76.

Figure 10:
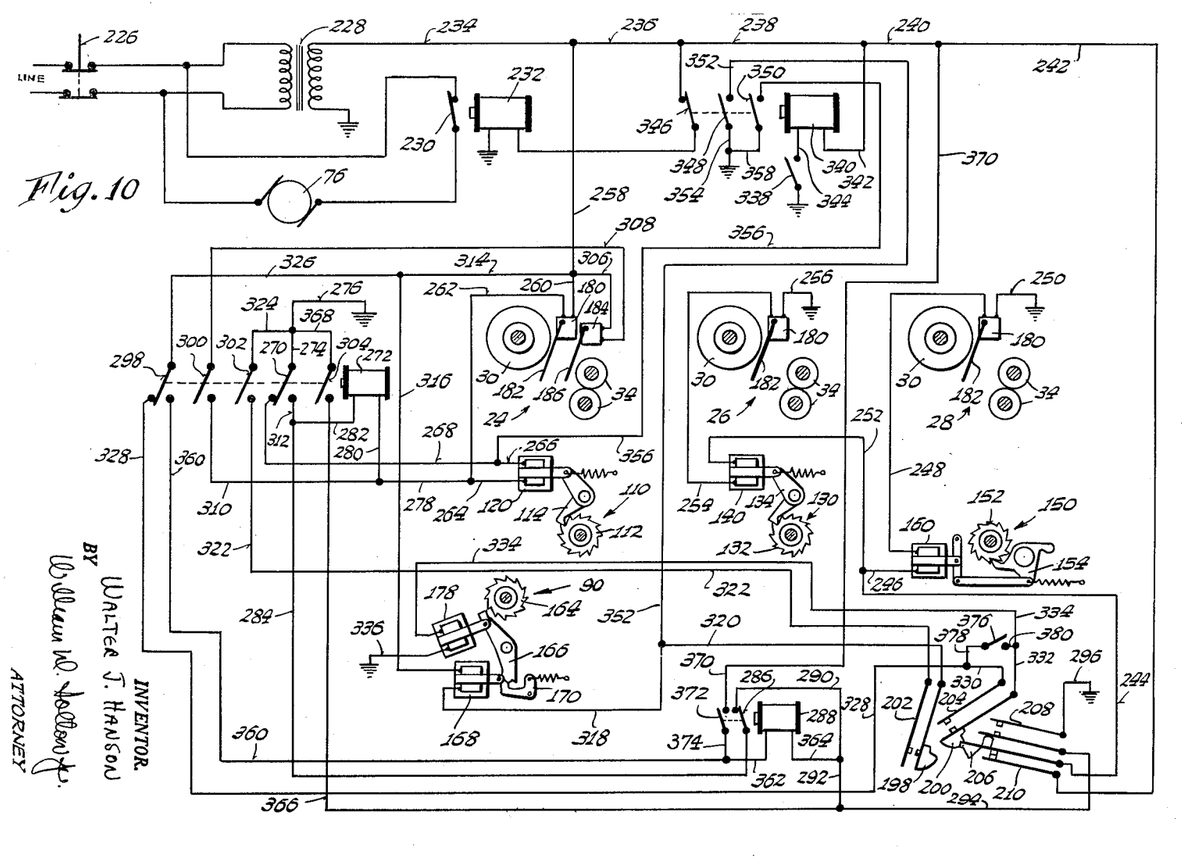
FIG. 10 is a schematic wiring diagram of an electrical control means according to said first embodiment.

The operation of the first embodiment of the invention will be described with reference to the schematic wiring diagram of FIG. 10. It will be assumed that the main clutch 90 is engaged, the cams 194 and 196 are in the position shown in FIG. 9, the switches 180 of hoppers 24, 26 and 28 are in untripped condition, and the switch 184 of hopper 24 is in untripped condition. A manually operable main switch 226 (at the upper left-hand corner of FIG. 10) is closed to electrically connect the motor 76 and the high voltage side of step down transformer 228 across a line source of electric current. Motor 76 is connected in series with a normally open switch 230 which is ordinarily maintained in the closed condition by a relay 232 so long as switch 226 is closed. With closing of main switch 226, the first document of the respective stack in each of hoppers 24, 26 and 28 is forwardly fed until the respective switch 180 of each of these hoppers is tripped to closed condition whereby all three of hopper clutch solenoids 120, 140 and 160 are energized so that these three hoppers stop feeding with the respective first documents being held in a ready position. In this regard, hopper clutch solenoids 140 and 160 are energized by virtue of the closed current path extending in series from the low voltage side of transformer 228 (one end of which is grounded as shown in FIG. 10) along leads 234, 236, 238, 240, 242, 244, and then in parallel along lead 246, solenoid 160, lead 248, closed switch 180 and lead 250 to ground and lead 252, solenoid 140, lead 254, switch 180, and lead 256 to ground. Hopper clutch solenoid 120 is energized by virtue of the closed current path extending from the low voltage side of transformer 228, along leads 234, 258, 260, closed switch 180, leads 262, 264, solenoid 120, leads 266, 268, the closed switch 270 of a relay 272, and leads 274, 276 to ground. All three of solenoids 120, 140 and 160 being energized, all three of hopper clutches 110, 130 and 150 are disengaged so that no documents are being fed by any of the three hoppers 24, 26 and 28.

Motor 76 being energized and main clutch 90 being engaged, cams 194 and 196 are rotated in the clockwise direction (as viewed in FIG. 9) whereupon the cam follower 206 (at the lower right-hand corner of FIG. 10) is depressed momentarily by cam 196 to close switch 208 and open switch 210.

This momentary opening of switch 210 effects de-energization of hopper clutch solenoids 140 and 160 thereby causing engagement of the hopper clutches 130 and 150 iwth the result that hoppers 26 and 28 begin feeding their respective documents (envelopes in the case of hopper 28) in one-by-one succession to their respective delivery positions. Switch 210 remains open only momentarily (as cam 196 of FIG. 9 continues to rotate), but sufficiently long that the trailing edge of the first document fed from each of hoppers 26 and 28 will have cleared the respective switch operating arm 182 of that hopper before re-closing of the switch 210. Consequently, both of hoppers 26 and 28 continue to feed until the leading edge of the next respective document (after the first one) trips the respective switch operating arms 182 of these two hoppers; this being so because hopper clutches 130 and 150 remain engaged so long as the switches 180 of these two hoppers are in untripped condition. Upon tripping of the switch operating arms 182 of hoppers 26 and 28, hopper clutches 130 and 150 are again disengaged to stop the feed of these said next successive documents from hoppers 26 and 28 at a position holding the switch operating arms 182 of these two hoppers in tripped condition. Accordingly, it will be clear that each time demand switch 210 is momentarily opened, a single document is fed from hopper 26 and a single envelope is fed from hopper 28.

In the manner now to be described, each time switch 208 is momentarily closed by the cam 196 (FIG. 9), the feeding of documents begins in one-by-one succession from hopper 24. The closing of momentary demand switch 208 establishes a closed current path from the low side of transformer 228 along leads 234, 258, 260, switch 180, leads 262, 278, 280, relay 272, leads 282, 284, switch 286 of a momentary demand relay 288, leads 290, 292, 294, switch 208 and lead 296 to ground. In this manner, relay 272 is energized to operate five switches 298, 300, 302, 270 and 304 of this relay. This opening of the normally closed contacts of relay switch 270 de-energizes hopper clutch solenoid 120 to engage hopper clutch 110 whereupon the hopper 24 begins feeding documents in one-by-one sucession to its delivery position. When relay 272 is energized, a hold-in circuit is established to maintain relay 272 in energized condition and hopper clutch solenoid 120 in de-energized condition whereby the feed of non-distinctive documents (which trip only switch 180 of hopper 24) continues even though a second and succeeding non-distinctive document being fed by hopper 24 trips the switch 180. This hold-in circuit includes normally closed hopper switch 184 and extends from the low voltage side of transformer 228 along leads 234, 258, 306, switch 184, lead 308, switch 300, leads 310, 280, relay 272, leads 282, 312, switch 270 and leads 274, 276 to ground. So long as only non-distinctive documents continue to be fed by the hopper 24, this hold-in circuit remains intact because switch 184 will be tripped to open condition only by a distinctive document, as previously described in connection with FIG. 8.

Hopper 24 continues to feed documents to its respective delivery position only until just after having fed the first distinctive document 50 during that respective feeding cycle, at which time this feed stops with the next document maintaining the hopper switch 180 of hopper 24 in tripped condition. This will be the case whether the next document after the first distinctive document is a distinctive or a non-distinctive document. Referring to FIG. 8 along with FIG. 10, it will be clear that when the first distinctive document 50 is being fed by hopper 24, the leading edge of this document will first engage operating arm 182 to trip hopper switch 180 to closed condition. As noted above, the tripping of switch 180 of hopper 24 is ineffective to disengage hopper clutch 110 because hopper solenoid 120 is being maintained in de-energized condition by the hold-in circuit through relay 272 and hopper switch 184. After tripping switch 180, the leading edge of the distinctive document 50 next engages operating arm 186 to trip hopper switch 184 to open condition. This is not effective to stop the feeding of hopper 24, however, because the hold-in circuit, instead of extending along the path from relay 272 along leads 280, 310, switch 300, lead 308, switch 184 and lead 306 back to the low voltage side of transformer 228, now extends along the path from relay 272 along leads 280, 278, 262, switch 180 of hopper 24, and lead 260 back to the low voltage side of transformer 228. The trailing edge of the distinctive document 50 clears the operating arm 182 of the switch 180 of hopper 24 before clearing the operating arm 186 of switch 184. Upon returning to the untripped condition, the switch 180 of hopper 24 will then be open at the same time switch 184 is open. Both of these switches being open simultaneously, the hold-in circuit is broken whereby relay 272 is de-energized and the five switches 298, 300, 302, 270 and 304 of this relay return to their normal condition. Hopper 24 continues to feed because, at the very least, one of switches 180 and 184 of this hopper must be closed to energize hopper clutch solenoid 120 (to disengage clutch 110). As the trailing edge of the distinctive document 50 clears operating arm 186 of switch 184, the switch 184 closes but this is still ineffective to cause energization of hopper clutch solenoid 120 to stop the feed of hopper 24. This is the case, of course, because switch 300 of relay 272 is now in its normally open condition preventing the establishment of a current flow path from switch 184 to hopper clutch solenoid 120. Hopper 24 continues to feed until the leading edge of the next document to be fed, whether distinctive or non-distinctive, engages the operating arm 182 of the switch 180 of hopper 24 to trip this switch. This again establishes a closed circuit through hopper clutch solenoid 120 (to disengage hopper clutch 110 to stop the feeding of hopper 24 with said next document holding the operating arm 182 in tripped condition). This closed circuit extends from the low voltage side of transformer 228 along leads 234, 258, 260, switch 180 of hopper 24, leads 262, 264, hopper clutch solenoid 120, leads 266, 268, switch 270 of relay 272, and leads 274, 276 to ground.

From the above, it will be clear that when cam 196 (FIG. 9) momentarily depresses cam follower 206, momentarily to close demand switch 208 and momentarily to open demand switch 210, hopper 24 will continue to feed documents from a stack of intermixed distinctive and non-distinctive documents to its delivery position until a distinctive document has been fed, hopper 26 will feed a single document from a stack to its delivery position, and hopper 28 will feed a single envelope from a stack to its delivery position. So long as motor 76 remains energized and main clutch 90 remains engaged, conveyor 54 then moves forwardly to advance the document or documents at the delivery position of hopper 24 to a first location between the delivery positions of hoppers 24 and 26. At the same time, the conveyor 54 operates on the documents advanced to said first location during the immediately preceding cycle of the machine 20 by assembling these documents with the single document last fed to the delivery position of hopper 26. The ram 56 overtakes this assembly of documents and inserts it into the envelope last fed to the delivery position of hopper 28 and forwardly advances the filled envelope to a location beyond the delivery position of hopper 28. This completes a single cycle of the machine 20, and a second cycle starts anew when momentary demand switches 208 and 210 are again tripped by the cam 196 (FIG. 9).

The feeding speed of hopper 24 is sufficiently high, as compared with that of hoppers 26 and 28, that a predetermined number of documents can be fed by this hopper to its delivery position during each operating cycle of the machine 20 before the conveyor 54 is next due to pick up and advance the documents then located at this delivery position. For a given installation, this predetermined number, which includes a variable number of non-distinctive documents 48 and a single distinctive document 50, will depend upon several factors, including, for one, the average number of non-distinctive documents 48 that will lie between successive distinctive documents 50 in the stacks of intermixed distinctive and non-distinctive documents. Of course, the feeding speed of hopper 24 could be equal to or even less than that of hoppers 26 and 28, but better efficiency ordinarily is achieved by the machine 20 when hopper 24 operates at a higher feeding speed.

The operation of the document handling machine 20 will now be described as it occurs when the condition arises that the number of non-distinctive documents 48 disposed between two successive distinctive documents 50 in the stack is more than one less than said predetermined number. This, of course, results in the hopper 24 continuing to feed a document or documents to its delivery position past the time when the conveyor is due to forwardly advance any documents at this delivery position. With continued rotation of cam shaft 192 (in the clockwise direction as viewed in FIG. 9) after demand switches 208 and 210 are momentarily tripped by cam 196, the node 224 of cam 194 will reach and then momentarily depress cam follower 198 to momentarily trip the cycle stop switch 202 to closed condition. If, at the time the cycle stop switch 202 momentarily closes, the above-noted hold-in circuit by which relay 272 is energized has not yet been broken (as will be the case if the trailing edge of a distinctive document 50 has not yet cleared the operating arm 182 of the switch 180 of hopper 24 during the hopper feeding period), a closed circuit will be established to energize the cycle stop solenoid 168 resulting in disengagement of main clutch 90. This closed circuit extends from the low voltage side of transformer 228 along leads 234, 258, 314, 316, cycle stop solenoid 168, leads 318, 320, cycle stop switch 202, lead 322, switch 302 of relay 272, and leads 324, 276 to ground. Main clutch 90 is retained in the disengaged condition after re-opering of cycle stop switch 202 by detent member 170 which holds pawl 166 in engaged relation with the ratchet wheel 164 of the main clutch 90.

It will be noted at this point that if the trailing edge of a distinctive document 50 has released the operating arm 182 of the switch 180 of hopper 24 to the untripped position before the momentary closing of cycle stop switch 202, the switch 302 of relay 272 will be open (because the relay 272 will have been de-energized) and cycle stop solenoid 168 will not be energized to disengage the main clutch 90. Accordingly, it is clear that main clutch 90 will be disengaged to delay the start of conveyor and ram operation only if a distinctive document has not yet been fed sufficiently to arrive at the delivery position of hopper 24 by the time the conveyor 54 is due to pick up and advance the document or documents at this delivery position. Alternatively, main clutch 90 will not be disengaged if the trailing edge of a distinctive document has released the operating arm 182 of switch 180 of hopper 24 to the untripped position when cycle stop switch 202 momentarily closes.

It is also to be noted that if the trailing edge of a distinctive document 50 clears the operating arm 182 of switch 180 of hopper 24 at a time such that this switch has just returned to the untripped position (whereby relay 272 becomes de-energized) when cycle stop switch 202 momentarily closes, the main clutch 90 will not be disengaged to delay the start of conveyor 54 even though the distinctive document 50 has not been fully fed to the respective delivery position. This is no problem, however, because once the distinctive document has released the operating arm 182 of switch 180 of hopper 24 to the untripped position, it takes a slightly greater time interval for conveyor 54 to pick up the document or documents at the delivery position of hopper 24 than it does for the distinctive document 50 to be fed to this delivery position. This is advantageous in that, thereby, the entire time interval up to picking up of the documents at the respective delivery positions, is available for the feeding of documents by the hopper 24.

The drive to hopper 24 by-passes the main clutch 90, as described above, so that the feed of documents by this hopper continues until the feeding of a distinctive document 50 even though operation of the conveyor 54 and ram 56 is delayed when the main clutch 90 is disengaged.

The drive to cam shaft 192 (FIG. 9), like that to the conveyor 54 and ram 56, is through the main clutch 90. Consequently, when main clutch 90 is disengaged to delay the operation of the conveyor and ram, cam shaft 192 is likewise stopped. A finite time interval ensues between closing of cycle stop switch 202 and stopping of the cam shaft 192 (at such times as the latter does occur) due to the momentum of the moving parts and because main clutch 90 does not disengage instantaneously with energization of main clutch stop solenoid 168. During this finite time interval, cam shaft 192 and cam 194 coast to the position at which the node 224 of cam 194 engages and depresses cam follower 200 to the tripped position whereby cycle resume switch 204 is maintained in closed condition. As soon thereafter as the trailing edge of a distinctive document 50 releases the operating arm 182 of switch 180 of hopper 24 to the open condition (whereby relay 272 is de-energized so that switch 298 of relay 272 returns to its normal position), a closed circuit is established to energize the main clutch start solenoid 178 whereby operation of the conveyor 54 and ram 56 starts. This closed circuit extends from the low voltage side of transformer 228 along leads 234, 258, 314, 326, switch 298, leads 328, 330, cycle resume switch 204, leads 332, 334, main clutch start solenoid 178 and lead 336 to ground. When operation of conveyor 54 and ram 56 resumes, clockwise rotation of cam shaft 192 (FIG. 9) also resumes whereupon cam 194 releases cycle resume switch 204 to the open condition and subsequently demand switches 208 and 210 are momentarily tripped to start a new cycle of operation of the machine 20.

It will be noted that even though the drive to hopper 24 by-passes the main clutch 90, the operation of this hopper (as well as the drive to hoppers 26 and 28, conveyor 54 and ram 56 which is through the main clutch) is delayed each time the main clutch is disengaged. This is the case, of course, because the start of each feeding operation of hopper 24 is determined by the tripping of demand switch 208, and cam 196 which trips this switch is also driven through the main clutch.

It will be clear from the above that the document handling machine 20 is automatically operable successively to go through the document feeding portion of a cycle and then the document conveying, collating and envelope-inserting portion of a cycle. So long as no more than the predetermined number of documents are fed by the hopper 24 during the feeding portion of a cycle, there will be no delay in the start of the succeeding document conveying, collating and envelope-inserting portion of the cycle. When more than the predetermined maximum number of documents are fed by the hopper 24, the succeeding document conveying, collating and envelope-inserting portion of the cycle will be delayed until the feeding of the last document (of that cycle) by the hopper 24. Further to recapitulate, hopper 28 feeds a single envelope, hopper 26 feeds a single document, and hopper 24 feeds a variable number of non-distinctive documents plus one distinctive document; all during each operating cycle of the machine 20. Each switch 180 of the two hoppers 26 and 28, respectively, is a sensing means operatively arranged to be tripped each time a document is fed by the respective hopper. The switches 180 and 184 of hopper 24 provide a sensing means operatively arranged to be tripped each time a distinctive document 50 is fed to the delivery position. The switches 180 and 184 of hopper 24 combine with cycle stop switch 202 and cycle resume switch 204 to provide a sensing means operatively arranged to be tripped only so long as the hopper 24 continues to feed one or more documents to its delivery position at the predetermined point in each operating cycle of the machine 20 when the conveyor 54 and ram 56 are due to start the conveying, collating and envelope-inserting operations. The switch 180 of each of hoppers 24, 26 and 28 combines with one of the momentary demand switches 208 and 210 to provide a sensing means operatively arranged to be tripped when the hopper feeding part of the cycle of machine 20 is to be started. The hopper clutch 110 with solenoid 120, hopper clutch 130 with solenoid 140, hopper clutch 150 with solenoid 160, and main clutch 90 with solenoids 168 and 178, provide respective control means to actuate and deactuate the hoppers 24, 26 and 28, conveyor 54 and ram 56, all as described above.

Referring again to FIG. 10, a manually operated emergency stop switch 338 is provided to quickly stop operation of the machine 20 at any time. When emergency stop switch 338 is manually closed, a closed circuit is completed to energize an emergency stop relay 340. This closed circuit extends from the low voltage side of transformer 228 along leads 234, 236, 238, 342, relay 340, lead 344 and emergency stop switch 338 to ground. Emergency stop relay 340 operates three switches 346, 348, and 350. Relay switch 346 is normally closed and completes a closed circuit to the relay 232 which, as noted above, normally maintains switch 230 in closed condition to energize motor 76 when the main switch 226 is closed. Switches 348 and 350 are provided to effect the disengagement of main clutch 90 and hopper clutch 110 when the emerency stop switch is closed. It will be apparent that if only motor 76 were de-energized by closing the emergency stop switch 338, the substantial coast of the parts driven by the motor 76 could be excessive in many situations. By also disengaging clutches 90 and 110, the hoppers 24, 26 and 28, conveyor 54 and ram 56 are more quickly stopped (thereby reducing possible damage to the machine 20. Closing of switch 348 (upon energization of emergency stop relay 340) completes an electrical circuit extending from the low voltage side of transformer 228, leads 234, 258, 314, 316, main clutch stop solenoid 168, leads 318, 352, switch 348 and lead 354 to ground. Closing of switch 350 completes an electrical circuit extending from the low voltage side of transformer 228 along leads 234 258 to either one or both of two parallel paths to ground. One of these parallel paths extends, when relay 272 is energized and switch 184 is closed, from lead 258 along lead 306, switch 184, lead 308, relay switch 300, leads 310, 278, 264, solenoid 120, leads 266, 356, switch 350 and lead 358 to ground. The other parallel path extends from lead 258 along lead 260 switch 180 of hopper 24, leads 262 and 264, solenoid 120, leads 266, 356, switch 350 and lead 358 to ground whenever switch 180 of hopper 24 closes as it does whenever a document, distinctive or non-distinctive, is fed by the hopper 24.

The momentary demand relay 288 was provided to protect against the possibility of the demand switch 208 failing to re-open after it momentarily closes. As previously described, the closing of demand switch 208 by cam 196 (FIG. 9) causes energization of relay 272 through switch 286 of momentary demand relay 288 and through momentary demand switch 208. When relay 272 is so energized, momentary demand relay 288 becomes energized by virtue of the closed circuit extending from the low voltage side of transformer 228, leads 234, 258, 314, 326, switch 298 of relay 272, leads 360, 362, momentary demand relay 288, leads 364, 292, 366, switch 304 of relay 272 and leads 368, 276 to ground. This closed circuit remains intact so long as relay 272 remains energized. Also, so long as demand switch 208 remains closed, momentary demand relay 288 remains energized by the hold-in circuit extending from the low voltage side of transformer 228, leads 234, 236, 238, 240, 370, switch 372 of momentary demand relay 288, leads 374, 362 momentary demand relay 288, leads 364, 292, 294, momentary demand switch 208 and lead 296 to ground. Accordingly momentary demand relay 288, once energized, remains energized so long as either relay 272 is energized or demand switch 208 is closed or both. So long as momentary demand relay 288 remains energized, switch 286 of momentary demand relay 288 remains open, thereby breaking any possible current flow path from momentary demand switch 208 through switch 286 of momentary demand relay 288 and through relay 272. Accordingly, once momentary demand switch 208 closes to energize relay 272, the demand switch 208 cannot re-energize the relay 272 after the latter is de-energized (upon feeding of a distinctive document 50) unless the demand switch 208 first re-opens and then again closes as it does in normal operation.

If emergency stop switch 338 is closed at any point in the operating cycle of the document-handling machine 20 other than that when cycle stop switch 202 closes, cam 194 will not come to rest in the position holding cycle resume solenoid 204 closed. When emergency switch 338 is subsequently re-opened to permit further operation by the machine 20, the main clutch 90 will not be engaged to effect such further operation because the main clutch can only be re-engaged by energizing main clutch solenoid 178. To provide for the re-engagement of main clutch 90 after emergency stop switch 338 is re-opened, a manually operated cycle resume switch 376 is connected by leads 378 and 380 to the ends of leads 330 and 332, respectively. Momentary manual closing of cycle resume switch 376 will be effective, so long as relay 272 is de-energized, to energize main clutch solenoid 178 by virtue of the closed circuit extending from the low voltage side of transformer 228 along leads 234, 258, 314, 326 normally closed switch 298 of relay 272, leads 328, 378, cycle resume switch 376, leads 380, 334, main clutch solenoid 178 and lead 336 to ground. It is to be noted that this closed circuit will not be established immediately upon the closing of cycle resume switch 376 if the machine 20 previously came to an emergency stop while hopper 24 was in the midst of a feeding operation because, in this case, relay 272 would be energized and switch 298 of this relay would be open. In this latter case, however, re-closing of the emergency stop switch 338 would de-energize hopper clutch solenoid 120 whereby hopper 24 would feed documents until a distinctive document 50 was fed whereupon relay 272 would become de-energized. As soon as relay 272 becomes de-energized, momentary manual closing of cycle resume switch 376 will then be effective to energize main clutch solenoid 178, thereby to re-engage the main clutch 90.

As described above, the distinctive document 50 of each group of documents fed by hopper 24, is the last document of the group to be fed. It will be obvious that by suitably modifying the hopper 24, the distinctive document 50 of each group would instead be the first document of each group to be fed. This could be accomplished, for example, by the provision of one or more additional pairs of driven feed rollers identical to and aligned with feed rollers 34, 34 so as to extend the feeding time for each document. The result, in this case, would be that hopper 24 would stop feeding before rather than just after each distinctive document 50 left the hopper 24. The overall operation of the document handling apparatus 20 would be the same with the exception that each feeding interval by hopper 24 would begin rather than end with the feeding of a distinctive document 50.

It will be clear that either one or both of hoppers 26 and 28 could be immobilized, for example, by disconnecting the drive thereto, whereby the document handling machine 20 would operate merely to separate the stack of intermixed distinctive and non-distinctive documents into groups; each group to include those documents fed during each feeding interval of the hopper 24.

Figure 11:
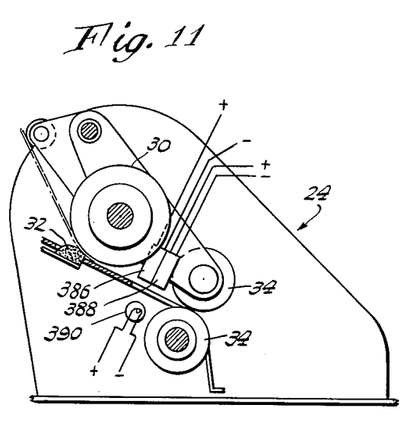
FIG. 11 is a side elevational view of one of the document feed hoppers, this view being similar to FIG. 6 but as adapted according to a second embodiment of the invention for the feeding of a variable number of documents during each operating cycle of the apparatus.
Figure 12:
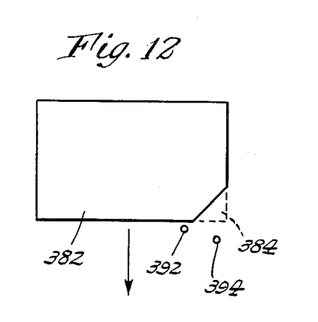
FIG. 12 is a more or less schematic view taken in plan and depicting the relation among a distinctive document shown in broken lines superimposed upon a non-distinctive document shown in full lines, and two cross-sectional portions of a light beam as respectively sensed by two photoelectric cells of the document feed hopper as shown in FIG. 11.
Figure 13:
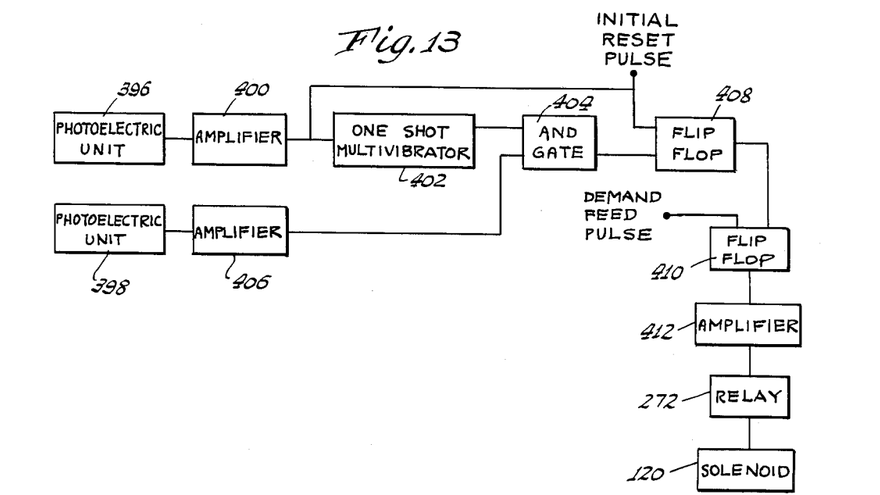
FIG. 13 is a block diagram of an electronic control means according to said second embodiment.

A second embodiment of the invention, now to be described with reference to FIGS. 11-13, is provided when the stack of intermixed distinctive and non-distinctive documents to be fed by the hopper 24 takes a somewhat different form. Referring to FIG. 12, the non-distinctive documents 382 according to this different form are rectangular with a cut-away corner as shown in full lines, and the distinctive documents 384 are rectangular with no cut-away corners as indicated in broken lines.

To accommodate the wiring arrangement shown in FIG. 10 to this second embodiment, switches 180 and 184 of hopper 24 are disconnected (or eliminated altogether) and the sensing means depicted in FIGS. 11-13 is substituted therefor. As will later be described, this substitution of the sensing means as depicted in FIGS. 11-13 involves additional electrical connections to the relay 272 and demand switch 208 from this sensing means. As shown in FIG. 11, the sensing means according to the second embodiment of the invention includes two photoelectric cells 386 and 388, respectively. Both of photoelectric cells 386 and 388 utilize a common light source 390. Each of these photoelectric cells is operable, in a conventional manner, to produce a peak output pulse when the light beam from source 390 to the respective photoelectric cell in interrupted. The light beam to cell 386 is depicted in FIG. 12 at 392, and the light beam to cell 388 is depicted at 394.

The operation of the second embodiment will be described in connection with the electronc block diagram of FIG. 13. All of the individual components of this block diagram are conventional, as will be readily recognized by those with only ordinary skill in the art. A first photoelectric unit 396, incorporating photocell 386 and light source 390, produces a peak pulse each time the light beam 392 is broken. As is obvious from FIG. 12, the leading edge of each document fed by hopper 24 whether a non-distinctive one 382 or a distinctive one 384, interrupts the light beam 392. A second photoelectric unit, incorporating photocell 388 and light source 390, produces a peak pulse each time the light beam 394 is broken. The leading edge of each document fed by hopper 24 will also interrupt the light beam 394. However, because light beam 394 is disposed laterally and forwardly (relative to the direction of feed of the documents by hopper 24 as indicated by the arrow in FIG. 12) of light beam 392, the leading edge of each distinctive document 384 will interrupt light beam 392 shortly before interrupting light beam 394. Also, since light beam 394 is disposed in the path of the cut-away corner of each of the non-distinctive documents 382 and light beam 392 is not, the leading edge of each non-distinctive document 382 will interrupt light beam 392 a comparatively longer time interval before interrupting light beam 394. Stated otherwise, light beam 392 is interrupted by both distinctive and non-distinctive documents at the same point in the feeding thereof by hopper 24 whereas each distinctive document 384 interrupts light beam 394 at a later point in the feeding thereof than that at which each non-distinctive document interrupts light beam 394. The result is that each distinctive document 384 effects a time differential between its interruption of light beams 392 and 394 shorter than the time differential between the interruption of light beams 392 and 394 by each non-distinctive document 382. It follows that the time differential between the peak pulses produced by photoelectric units 396 and 398 is greater when a non-distinctive document 382 is fed by hopper 24 than when a distinctive document 384 is fed.

After being amplified by an amplifier 400, each peak pulse produced by photoelectric unit 396 triggers a one-shot multi-vibrator (also known as a monostable vibrator) 402 which responds by producing a square-wave pulse of short duration. Each pulse produced by the one-shot multivibrator 402 is introduced into an "and" gate 404. Each peak pulse produced by the photoelectric unit 398, after being amplified by an amplifier 406, is also introduced into the "and" gate 404. In well known fashion, a pulse appears at the output of "and" gate 404 only when the latter receives simultaneous pulses at both of its inputs. The time differential between the peak pulses produced by photoelectric units 396 and 398 when a non-distinctive document 382 is fed, is sufficiently great that the peak pulse input to "and" gate 404 occurs after the termination of the short duration pulse input to the "and" gate with the result that no pulse appears at the output of the "and" gate. When, however, a distinctive document 384 is fed by the hopper 24, the peak pulse produced by photoelectric unit 398 lags that produce by photoelectric unit 396 by so short a time interval that the peak pulse input to the "and" gate 404 occurs within the duration of the square wave pulse input to the "and" gate whereby a pulse appears at the output of the "and" gate. Accordingly, "and" gate 404 produces an output pulse only when a distinctive document 384 is fed by hopper 24 to the delivery position.

Each output pulse from the "and" gate 404 is delivered to a flip-flop (also known as a bistable multivibrator) 408. As is well known, a flip-flop has two stable states or conditions. When in one of these states the flip-flop 408, as well as another flip-flop 410 shown in FIG. 13, will be referred to herein as being "set" or in the "set condition" and when in the other state will be referred to as being "reset" or in the "reset condition." Flip-flop 408, then, is set by receiving a pulse from the "and" gate 404 and is reset either by an initial reset pulse or by any one of the amplified pulses from amplifier 400. Flip-flop 408 incorporates a differentiating network (in well known fashion) such that it produces an output pulse only when it goes from the set to the reset condition. Flip-flop 410, on the other hand, is arranged such that when in the reset condition, its output is amplified by an amplifier 412 to de-energize the relay 272 and to energize the solenoid 120. When flip-flop 410 is in its set condition, relay 272 is energized and solenoid 120 is de-energized. Flip-flop 410 is reset by receiving an output pulse from flip-flop 408 or by receiving an initial reset pulse. This flip-flop 410 is set by receiving a demand feed pulse.

The main switch 226 (FIG. 10) is operatively arranged such that the initial reset pulse (as twice mentioned above and as indicated in FIG. 13) is produced each time this main switch is closed. The momentary demand feed switch 208 (FIG. 10) is operatively arranged such that the demand feed pulse (mentioned above and indicated in FIG. 13) is produced each time this demand feed switch 208 is closed.

Before describing the operation of the sensing means according to the second embodiment (FIGS. 11–13), it will be noted that as with the first embodiment as described above, hopper 24 feeds documents so long as solenoid 120 is de-energized and no documents are fed by hopper 24 so long as solenoid 120 is energized.

In describing the operation of the second embodiment of the invention, reference to the hoppers 26 and 28 shall be omitted since it will be realized that each time hopper 24 feeds a single distinctive document 384 and a variable number of non-distinctive documents 382, hopper 26 will feed a single document and hopper 28 will feed a single envelope; all as occurs with the first embodiment. After loading hopper 24 with a stack of intermixed distinctive and non-distinctive documents, main switch 226 is closed whereupon an initial reset pulse resets both or either one of the flip-flops 408 and 410 if, for any reason, both or either one of these flip-flops was not already in the reset condition. As a result, both of the flip-flops 408 and 410 are in the reset condition, relay 272 is de-energized, solenoid 120 is energized, and no documents are being fed by the hopper 24. Flip-flop 410 remains energized so that no documents are fed by the hopper 24 until the cam 196 (FIG. 9) next closes momentary demand switch 208 whereupon a demand feed pulse is delivered to flip-flop 410. This sets flip-flop (from the reset condition) whereby relay 272 becomes energized and solenoid 120 becomes de-energized so that hopper 24 starts its document feeding operation. So long as only non-distinctive documents 382 are fed by the hopper 24, each peak pulse produced by photoelectric unit 398 will occur sufficiently later than that produced by photoelectric unit 396 that the peak pulse from amplifier 406 occurs later than, rather than during, the square wave pulse from the one-shot multivibrator 402. As a result, no output is produced by the "and" gate 404, and the hopper 24 continues to feed. With the feeding of the first distinctive document 384, whether this is the first document or a succeeding one fed by the hopper 24, the peak pulse produced by the photoelectric unit 396 occurs sufficiently soon after the peak pulse produced by the photoelectric unit 396 that the peak pulse from amplifier 406 occurs during the square-wave pulse from the one-shot multivibrator 402. The "and" gate 404 responds to the simultaneously received pulses by delivering a pulse to set flip-flop 408. No output is produced by the flip-flop 408 at this time, however, since this flip-flop produces an output pulse only when it goes from the set to the reset condition. Accordingly, the distinctive document 384 is fed to the delivery position of hopper 24 and the next succeeding document starts to be fed by the hopper 24. The peak pulse from amplifier 400, occurring upon the start of feeding of this next succeeding document whether a distinctive or a non-distinctive one, resets the flip-flop 408 from the set condition whereupon the latter delivers a resetting pulse to the flip-flop 410. Flip-flop 410 is accordingly reset to de-energize relay 272, energize solenoid 120 and stop the feed of this next succeeding document before this document leaves the hopper 24. It is apparent, then, that hopper 24 starts feeding documents when demand switch 208 closes and stops feeding after the first distinctive document is fed; all as also occurs with the first embodiment.

The remainder of the circuitry depicted in FIG. 10 (with the exception of the normally open contacts of switch 298 of relay 272, switches 300, 270 and 304 of relay 272, momentary demand relay 288, and the switches operated by relay 288; since all of these circuit components become ineffective when switches 180 and 184 of hopper 24 are disconnected as noted above) operates in the same manner as that described above in connection with the first embodiment. In this regard, the closing of cycle stop switch 202 has no effect if hopper 24 has stopped feeding documents; otherwise, the closing of the cycle stop switch 202 is effective to disengage the main clutch 90 whereby the drive to the conveyor 54 and ram 56 (and hoppers 26 and 28) is discontinued until hopper 24 does stop feeding documents. Also, the closing of emergency stop switch 338, the re-opening of this stop switch, the manual closing of cycle resume switch 376, the automatic closing of cycle resume switch 204, etc., all effect the same results as that described above in connection with the first embodiment.

Since many changes could be made in the embodiments of the invention particularly described and shown herein without departing from the scope of the invention, it is intended that these embodiments be considered as exemplary and that the invention not be limited except as warranted by the following claims.

What is claimed is:

1. A cyclically operable apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: feeding means, operable during each cycle, to feed documents from said stack in one-by-one succession to a delivery position; control means, operable when actuated, to stop the feed of said documents by said feeding means; sensing means responsive to the feeding of said distinctive documents to actuate said control means during each cycle whenever one of said distinctive documents is fed by said feeding means; and advancing means operable to forwardly advance the document or documents disposed at said delivery position after each feeding operation of said feeding means.

2. A cyclically operable apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: feeding means, operable during each cycle, for feeding documents from said stack in one-by-one succession to a delivery position until the feeding of the first one of said distinctive documents; advancing means, operable during each cycle after sufficient time elapses for said feeding means to feed a predetermined number of documents, to forwardly advance the document or documents at said delivery position; and control means operatively connected for delaying the operation of said advancing means so long as said feeding means continues to feed more than said predetermined number of documents during each cycle.

3. A cyclically operable apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: feeding means operable during each cycle, to feed documents from said stack in one-by-one succession to a delivery position until the feeding of the first one of said distinctive documents; advancing means operable to forwardly advance the document or documents at said delivery position; driving means operatively connected to continuously drive said document advancing means cyclically to advance the document or documents disposed at said delivery position after sufficient time elapes for said feeding means to feed a predetermined number of documents during each cycle; said driving means including a normally engaged clutch; and control means operatively connected for disengaging said clutch so long as said feeding means continues to feed more than said predetermined number of documents during each cycle.

4. An apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: means for forwardly advancing any documents disposed at a delivery position; driving means, when actuated, for driving said advancing means cyclically to advance, at predetermined intervals, any documents disposed at the delivery position; means for feeding the documents of said stack from the latter in one-by-one succession to said delivery position; driving means, when actuated, for continuously driving said document feeding means at a rate sufficient to feed a predetermined number of successive documents between each two succeeding ones of said advancing intervals; control means operatively connected to de-actuate said last-named driving means when each distinctive document is being fed; and control means operatively connected to actuate said last-named driving means after each of said predetermined intervals and to de-actuate said first-named driving means only so long as said document feeding means continues to feed more than said predetermined number of documents.

5. An apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: means for forwardly advancing any documents disposed at a delivery position; driving means, when actuated, for driving said advancing means cyclically to advance, at predetermined intervals, all documents disposed at the delivery position; feeding means for feeding the documents of said stack from the latter in one-by-one succession to said delivery position; sensing means operatively arranged to be tripped each time a distinctive document is being fed by said feeding means; driving means, when actuated, for continuously driving said document feeding means at a rate sufficient to feed a predetermined number of successive documents between each two succeeding ones of said advancing intervals; and control means operatively arranged to de-actuate said last-named driving means when said sensing means is tripped, to actuate said last-named driving means after each of said predetermined intervals, and to de-actuate said first-named driving means only so long as said feeding means continues to feed more than said predetermined number of documents to said delivery position.

6. An apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: means for feeding the documents from said stack in one-by-one succession to a delivery position; driving means, when actuated, for continuously driving said document feeding means; first sensing means operatively arranged to be tripped during the feeding of each distinctive document; means for forwardly advancing documents disposed at the delivery position; driving means, when actuated, for driving said advancing means cyclically to periodically advance all documents at the delivery position; second sensing means operatively arranged to be tripped only so long as said first-named driving means remains actuated at a predetermined point in each cycle of the advancing means before the latter is due to advance all documents at the delivery position; and control means operatively arranged to actuate said first-named driving means each time said advancing means advances documents from said delivery position, to de-actuate said first-named driving means each time said first sensing means is tripped, and to de-actuate said last-named driving means only so long as said second sensing means is tripped.

7. A cyclically operable apparatus for separating a stack of intermixed distinctive and non-distinctive documents into groups, each of said groups to comprise a respective distinctive document and any non-distinctive documents between one side of that respective distinctive document and the next distinctive document of the stack; said apparatus comprising: feeding means operable, during each actuation thereof, to feed the documents of one of said groups in one-by-one succession to a delivery position; advancing means operable, during each cycle after an elapse of time just sufficient for the feeding of a predetermined number of documents by said feeding means, to forwardly advance the document or documents at said delivery position; a first control means for actuating said feeding means each time said advancing means forwardly advances the document or documents at said delivery position; first drive means for driving said feeding means; second drive means for driving said advancing means; third drive means for driving said first control means; said first and second drive means including a clutch by-passed by said third drive means; and a second control means operatively arranged to disengage said clutch only so long as said feeding means continues to feed more than said predetermined number of documents.

8. An apparatus for separating a stack of intermixed distinctive and non-distinctive documents into groups, each of said groups to comprise a respective distinctive document and any non-distinctive documents between one side of that respective distinctive document and the next distinctive document of the stack; said apparatus comprising: feeding means for feeding the documents of said stack from the latter in one-by-one succession to a delivery position; sensing means operatively arranged to be tripped during the feeding of each distinctive document by said feeding means; advancing means operable during each cycle to forwardly advance the documents at said delivery position and control means operatively arranged to actuate said feeding means each time the document or documents at said delivery position are forwardly advanced, to de-actuate said feeding means each time said sensing means is tripped, and to delay the operation of said advancing means only so long as said feeding means continues to feed documents at a predetermined point in each operating cycle before the document or documents at said delivery position are due to be forwardly advanced.

9. An apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: means for forwardly advancing any documents disposed at a delivery position; means for feeding the documents of said stack from the latter in one-by-one succession to said delivery position; a first clutch and a second clutch; each of said clutches having a driving portion and a driven portion; means operatively connected to continuously drive the driving portions of both of said clutches; the driven portion of said first clutch being operatively connected to drive said document advancing means cyclically to advance, at predetermined intervals, all documents disposed at the delivery position; the driven portion of said second clutch being operatively connected to drive said document feeding means at a rate sufficient to feed a predetermined number of successive documents between each two succeeding ones of said advancing intervals; first sensing means operatively arranged to be tripped during the feeding of each distinctive document; second sensing means operatively arranged to be tripped only so long as said document feeding means continues to feed more than said predetermined number of documents; and control means operatively connected to engage said second clutch after each of said advancing intervals, to disengage said second clutch each time said first sensing means is tripped, and to disengage said first clutch only so long as said second sensing means is in tripped condition.

10. An apparatus for separating a stack of intermixed distinctive and non-distinctive documents into groups, each of said groups to comprise a respective distinctive document and any non-distinctive documents between one side of the respective distinctive document and the next distinctive document of the stack; said apparatus comprising: means for forwardly advancing any documents disposed at a delivery position; driving means, when actuated, for driving said advancing means cyclically to advance, at predetermined intervals, all documents disposed at the delivery position; means for feeding the documents of said stack from the latter in one-by-one succession to said delivery position; first sensing means operatively arranged to be tripped during the feeding of each distinctive document by said document feeding means; driving means, when actuated, for continuously driving said document feeding means at a rate sufficient to feed a predetermined number of successive documents between each two succeeding ones of said advancing intervals; second sensing means operatively arranged to be tripped only so long as said document feeding means continues to feed more than said predetermined number of documents; and control means operatively connected to actuate said last-named driving means after each of said advancing intervals, to de-actuate said last-named driving means each time said first sensing means is tripped, and to de-actuate said first-named driving means only so long as said second sensing means is in tripped condition.

11. An apparatus for separating a stack of intermixed distinctive and non-distinctive documents into groups and inserting each of the groups into an envelope; each of said groups to comprise a respective distinctive document and any non-distinctive documents between one side of the respective distinctive document and the next distinctive document of the stack; said apparatus comprising: first feeding means for feeding the documents of said stack from the latter in one-by-one succession to a first delivery position; first sensing means operatively arranged to be tripped during the feeding of each distinctive document by said first feeding means; second feeding means for feeding envelopes from a stack on one-by-one succession to a second delivery position; cyclic means operable during each cycle to forwardly advance one of said groups and one of said envelopes at the first delivery position and second delivery position, respectively, and to insert one of said groups into one of said envelopes; second sensing means operatively arranged to be tripped only so long as said first feeding means continues to feed at a predetermined point in each of said cycles before the cyclic means is due to forwardly advance all documents at each of the delivery positions; and control means operatively arranged to actuate said first feeding means and said second feeding means each time the cyclic means forwardly advances one of said groups and one of said envelopes at the respective delivery positions, to de-actuate said first feeding means each time said first sensing means is tripped, to de-actuate said second feeding means after a single envelope has been fed to said second delivery position, and to de-actuate said cyclic means only so long as said second sensing means is in tripped condition.

12. A collating apparatus operable to provide a plurality of successive collations; each collation to include only one document from a first stack of documents and, from a second stack of intermixed distinctive and non-distinctive documents, only one of the distinctive documents and any non-distinctive documents between one side of that respective distinctive document and the next distinctive document of the second stack; said collating apparatus comprising: first feeding means for feeding the documents of said first stack from the latter in one-by-one succession to a first delivery position; first sensing means operatively arranged to be tripped each time a document is fed by said first feeding means to said delivery position; second feeding means for feeding the documents of said second stack from the latter in one-by-one succession to a second delivery position; second sensing means operatively arranged to be tripped during the feeding of each distinctive document by said second feeding means; advancing and assembling means operable during each cycle to forwardly advance the documents at each of said delivery positions and to assemble one of said collations; and control means operatively arranged to actuate said first feeding means and said second feeding means each time the documents at each of said delivery positions are forwardly advanced and one of said collations is assembled, to de-actuate said first feeding means each time said first sensing means is tripped, to de-actuate said second feeding means each time said second sensing means is tripped, and to delay the operation of said advancing and assembling means only so long as said second feeding means continues to feed documents at a predetermined point in each operating cycle before the documents at said second delivery position are due to be forwardly advanced.

13. A collating apparatus operable to provide a plurality of successive collations; each collation to include only one document from a first stack of documents and, from a second stack of intermixed distinctive and non-distinctive documents, only one of the distinctive documents and any non-distinctive document between one side of that respective distinctive document and the next distinctive document of the second stack; said collating apparatus comprising: first feeding means for feeding the documents of said first stack from the latter in one-by-one succession to a first delivery position; first sensing means operatively arranged to be tripped each time a document is fed by said first feeding means to said delivery position; first driving means, when actuated, for continuously driving said first feeding means; second feeding means for feeding the documents of said second stack from the latter in one-by-one succession to a second delivery position; second sensing means operatively arranged to be tripped during the feeding of each distinctive document by said second feeding means; second driving means, when actuated, for continuously driving said second feeding means; cyclic means operable during each cycle to forwardly advance all documents at each of said delivery positions and to assemble one of said collations; third driving means, when actuated, for periodically driving said cyclic means through said cycle; third sensing means operatively arranged to be tripped only so long as said second driving means remains actuated at a predetermined point in each of said cycles before the cyclic means is due to forwardly advance all documents at each of the delivery positions; and control means operatively arranged to actuate said first driving means and said second driving means each time the cyclic means forwardly advances all the documents at each of said delivery positions, to de-actuate said first driving means each time said first sensing means is tripped, to de-actuate said second driving means each time said second sensing means is tripped, and to de-actuate said third driving means only so long as said third sensing means is in tripped condition.

14. A collating apparatus operable to provide a plurality of successive collations from at least two stacks of documents; one of said stacks having a plurality of intermixed distinctive and non-distinctive documents; and each of said collations including only one of the documents of the other one of said stacks, only one of the distinctive documents, and any non-distinctive documents between one side of the respective distinctive document and the next distinctive document of said one stack; said collating apparatus comprising: first means for feeding the documents of said one stack from the latter in one-by-one succession to a first delivery position; first sensing means operatively arranged to be tripped during the feeding of each distinctive document; second means for feeding the documents of said other stack from the latter in one-by-one succession to a second delivery position; cyclic means operable during each cycle to forwardly advance all documents at each of said delivery positions and to assemble one of said collations; second sensing means operatively arranged to be tripped only so long as said first means continues to feed a respective document at a predetermined point in each of said cycles before the cyclic means is due to forwardly advance all documents at each of the delivery positions; and means operatively arranged to actuate said first means and said second means each time the cyclic means forwardly advances all the documents at each of said delivery positions, to de-actuate said first means each time said first sensing means is tripped, to de-actuate said second means after a single document has been fed to said second delivery position, and to de-actuate said cyclic means only so long as said second sensing means is in tripped condition.

15. An apparatus for separating a stack of intermixed distinctive and non-distinctive documents into groups and inserting each of the groups along with one of a plurality of other documents into an envelope; each of said groups to comprise a respective distinctive document and any non-distinctive documents between one side of the respective distinctive document and the next distinctive document of the stack; said apparatus comprising: first feeding means for feeding the documents of said stack from the latter in one-by-one succession to a first delivery position; first sensing means operatively arranged to be tripped during the feeding of each distinctive document by said first feeding means; second feeding means for feeding said other documents from a stack in one-by-one succession to a second delivery position; third feeding means for feeding said envelopes from a stack in one-by-one succession to a third delivery position; cyclic means operable during each cycle to forwardly advance one of said groups, one of said other documents and one of said envelopes at the first, second and third delivery positions, respectively, and to insert one of said groups and one of said other documents into one of said envelopes; second sensing means operatively arranged to be tripped only so long as said first feeding means continues to feed at a predetermined point in each of said cycles before the cyclic means is due to forwardly advance all documents at each of the delivery positions; and control means operatively arranged to actuate said first, second and third feeding means each time the cyclic means forwardly advances one of said groups, one of said other documents and one of said envelopes at the respective delivery positions, to de-actuate said first feeding means each time said first sensing means is tripped, to de-actuate said second and third feeding means after a single other document and a single envelope have respectively been fed to the second and third delivery positions, and to de-actuate said cyclic means only so long as said second sensing means is in tripped condition.

References Cited in the file of this patent

UNITED STATES PATENTS

| | | |
|---|---|---|
| 1,803,049 | Bonton | Apr. 28, 1931 |
| 1,916,847 | McCarthy | July 4, 1933 |
| 2,736,999 | Ronan | Mar. 6, 1956 |
| 2,766,569 | Strother | Oct. 16, 1956 |
| 2,771,726 | Owen | Nov. 27, 1956 |
| 2,839,880 | Bonghton | June 24, 1958 |